US012127243B2

(12) United States Patent
Hirata et al.

(10) Patent No.: US 12,127,243 B2
(45) Date of Patent: Oct. 22, 2024

(54) WIRELESS COMMUNICATION DEVICE AND METHOD, AND WIRELESS COMMUNICATION TERMINAL AND METHOD

(71) Applicant: Sony Group Corporation, Tokyo (JP)

(72) Inventors: Ryuichi Hirata, Tokyo (JP); Yusuke Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 292 days.

(21) Appl. No.: 17/640,841

(22) PCT Filed: Oct. 5, 2020

(86) PCT No.: PCT/JP2020/037694
§ 371 (c)(1),
(2) Date: Mar. 7, 2022

(87) PCT Pub. No.: WO2021/075290
PCT Pub. Date: Apr. 22, 2021

(65) Prior Publication Data
US 2022/0346113 A1    Oct. 27, 2022

(30) Foreign Application Priority Data

Oct. 15, 2019  (JP) ................. 2019-188400
Oct. 18, 2019  (JP) ................. 2019-191004

(51) Int. Cl.
*H04J 3/00*     (2006.01)
*H04W 72/566*   (2023.01)
*H04W 76/15*    (2018.01)

(52) U.S. Cl.
CPC ......... *H04W 72/566* (2023.01); *H04W 76/15* (2018.02)

(58) Field of Classification Search
CPC . H04W 72/566; H04W 76/15; H04W 74/006; H04W 74/0808; H04W 74/04; H04W 84/12; H04W 28/04; H04W 28/082
(Continued)

(56) References Cited

U.S. PATENT DOCUMENTS

2017/0202023 A1*  7/2017  Zhou ................ H04W 24/10
2018/0007714 A1*  1/2018  Yoshimura .......... H04W 84/12
(Continued)

FOREIGN PATENT DOCUMENTS

JP    2019-87916 A    6/2019

OTHER PUBLICATIONS

International Search Report and Written Opinion mailed on Dec. 22, 2020, received for PCT Application PCT/JP2020/037694, Filed on Oct. 5, 2020, 9 pages including English Translation.
(Continued)

*Primary Examiner* — Chuong T Ho
(74) *Attorney, Agent, or Firm* — XSENSUS LLP

(57) ABSTRACT

The present technology relates to a wireless communication device and method, and a wireless communication terminal and method which allow for increased transmission opportunities using multi-link aggregation.
A communication control device transmits a first parameter and a second parameter. The first parameter is used for setting of communication in which a wireless communication terminal uses a plurality of links. The second parameter is used for setting of communication in which the wireless communication terminal uses a single link. It is possible to apply the present technology to a wireless communication system.

12 Claims, 12 Drawing Sheets

(58) Field of Classification Search
USPC .......................................................... 370/336
See application file for complete search history.

(56) References Cited

U.S. PATENT DOCUMENTS

| | | | | |
|---|---|---|---|---|
| 2019/0082463 | A1* | 3/2019 | Patil | H04W 74/0808 |
| 2019/0150214 | A1* | 5/2019 | Zhou | H04W 76/15 |
| | | | | 370/329 |
| 2020/0288523 | A1* | 9/2020 | Patil | H04W 80/02 |
| 2020/0359259 | A1* | 11/2020 | Patil | H04W 28/06 |
| 2021/0014911 | A1* | 1/2021 | Patil | H04W 72/0446 |
| 2021/0315036 | A1* | 10/2021 | Jang | H04W 76/15 |

OTHER PUBLICATIONS

Chitrakar et al., "Power Consideration for Multi-link Transmissions", IEEE 802. 22-19/1536r0, IEEE, Available Online at: https://mentor.ieee.org/802.11/dcn/19/11-19-1536-00-00be-power-consideration-for-multi-link-transmissions.pptx, Sep. 14, 2019, 5 pages.

Huang et al., "Multi-link Operation Framework", IEEE 802. 22-19/0773r7, IEEE, Available Online at: https://mentor.ieee.org/802.11/dcn/19/11-19-0773-07-00be-multi-link-operation-framework.pptx, Sep. 14, 2019, 10 pages.

Jang et al., "Discussion on Multi-link Setup", IEEE 802. 22-19/1509r0, IEEE, Available Online at: https://mentor.ieee.org/802.11/dcn/19/11-19-1509-00-00be-discussion-on-multi-link-setup.pptx, Sep. 15, 2019, 7 pages.

Jang et al., "Channel Access for Multi-link Operation", IEEE 802. 22-19/1144r4, IEEE, Available Online at: https://mentor.ieee.org/802.11/dcn/19/11-19-1144-04-00be-channel-access-for-multi-link-operation.pptx, Sep. 19, 2019, 8 pages.

Li et al., "Channel Access in Multi-band operation", IEEE 802.22-19/1116r2, IEEE, Available Online at:https://mentor.ieee.org/802.11/dcn/19/11-19-1116-02-00be-channel-access-in-multi-band-operation.pptx, Sep. 19, 2019, 8 pages.

* cited by examiner

WIRELESS COMMUNICATION DEVICE AND METHOD, AND WIRELESS COMMUNICATION TERMINAL AND METHOD

CROSS-REFERENCE TO RELATED APPLICATIONS

The present application is based on PCT filing PCT/JP2020/037694, filed Oct. 5, 2020, which claims priority to Japanese Patent Application No. 2019-188400, filed Oct. 15, 2019, and Japanese Patent Application No. 2019-191004, filed Oct. 18, 2019, the entire contents of each are incorporated herein by reference.

TECHNICAL FIELD

The present technology relates to a wireless communication device and method, and a wireless communication terminal and method; and more particularly to a wireless communication device and method, and a wireless communication terminal and method which allow for increased transmission opportunities using multi-link aggregation.

BACKGROUND ART

Use of a wireless LAN (Local Area Network) has recently been expected in, for example, VR (Virtual Reality). In order to deal with VR or the like, it is desired to increase maximum throughput of the wireless LAN. In a next generation WLAN standard, multi-link aggregation is attracting attention as one of techniques for increasing the maximum throughput. The multi-link aggregation ensures wider bandwidth by simultaneously using a plurality of links.

It is not possible to perform transmission using multi-link aggregation (hereinafter referred to as MLA transmission) unless transmission opportunities (transmission rights) are acquired in a plurality of links. In contrast, if transmission is to be performed using only one link (hereinafter referred to as non-MLA transmission), it is possible to perform the transmission as soon as a transmission opportunity is acquired in a single link. Accordingly, if a terminal that performs the non-MLA transmission and a terminal that performs the MLA transmission coexist, there are many cases where the terminal that performs the non-MLA transmission starts transmission first while the terminal that performs the MLA transmission is in a standby mode, which causes a channel to be busy and disables the MLA transmission.

PTL 1 proposes a method of predicting a channel usage status after a predetermined time has elapsed, generating a predicted idle probability indicating an idle probability of a wireless channel for each predetermined time, and transmitting, on the basis of the predicted idle probability, data as a packet for each of a plurality of frequency bands at the same timing.

CITATION LIST

Patent Literature

PTL 1: Japanese Unexamined Patent Application Publication No. 2019-87916

SUMMARY OF THE INVENTION

Problems to be Solved by the Invention

As described above, in a case where a terminal that performs non-MLA transmission and a terminal that performs MLA transmission coexist, it is urgently desired to provide a proposal that gives priority to the MLA transmission over the non-MLA transmission.

The present technology has been made in view of the above circumstances, and it is an object of the present technology to increase transmission opportunities using multi-link aggregation.

Means for Solving the Problems

A wireless communication device according to one aspect of the present technology includes a communication section that transmits a first parameter and a second parameter. The first parameter is used for setting of communication in which a wireless communication terminal uses a plurality of links. The second parameter is used for setting of communication in which the wireless communication terminal uses a single link.

A wireless communication terminal according to another aspect of the present technology includes a communication section that performs, during a predetermined period, communication on a basis of setting using a first parameter or a second parameter, the first parameter being used for setting of communication using a plurality of links, the second parameter being used for setting of communication using a single link.

According to one aspect of the present technology, a first parameter and a second parameter are transmitted. The first parameter is used for setting of communication in which a wireless communication terminal uses a plurality of links. The second parameter is used for setting of communication in which the wireless communication terminal uses a single link.

According to another aspect of the present technology, communication is performed, during a predetermined period, on a basis of setting using a first parameter or a second parameter. The first parameter is used for setting of communication using a plurality of links. The second parameter is used for setting of communication using a single link.

MODES FOR CARRYING OUT THE INVENTION

The following describes some embodiments for carrying out the present technology. Description is given in the following order.
0. Configuration Examples of System and Device
1. First Embodiment (An example in which notification is sent from an AP)
2. Second Embodiment (An example in which a request is sent from a STA)
3. Others 0. Configuration Examples of System and Device <Configuration Example of Wireless Communication System>

Figure 1:
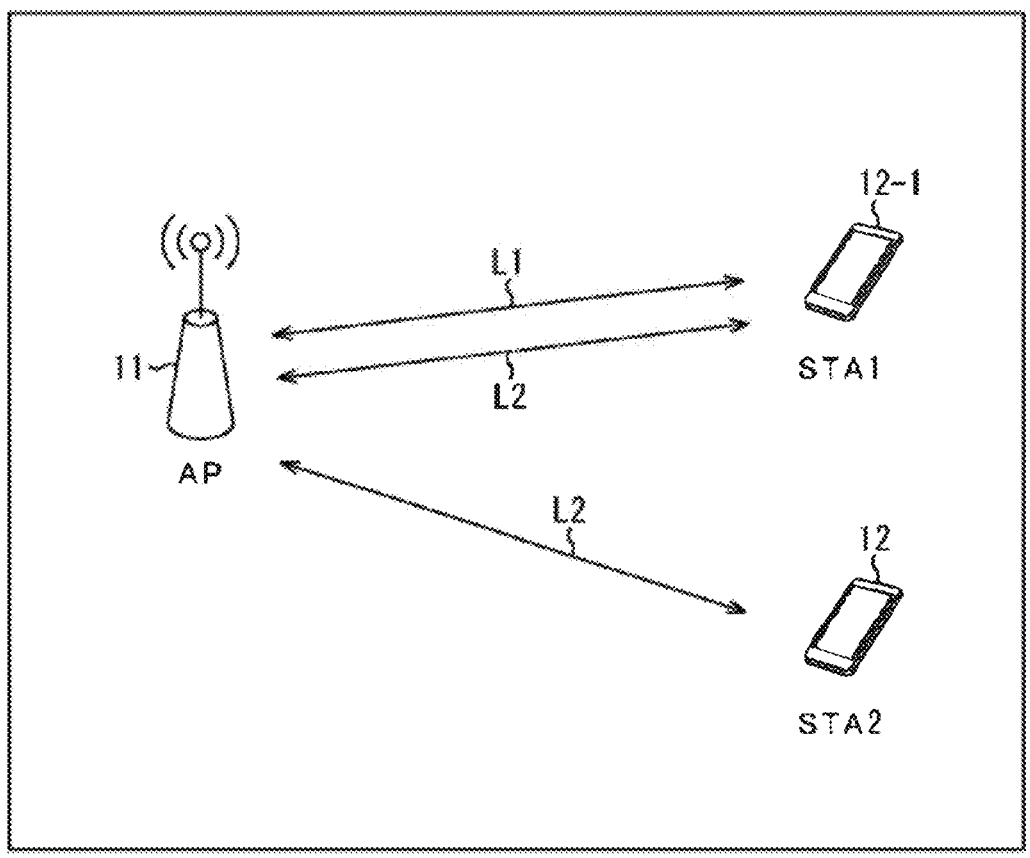
FIG. 1 is a diagram illustrating a configuration example of a wireless communication system according to the present technology.

FIG. 1 is a diagram illustrating a configuration example of a wireless communication system according to an embodiment of the present technology.

The wireless communication system of FIG. 1 is configured by coupling, via wireless communication: an access point (hereinafter referred to as AP); and a STA1 and a STA2 which are each a wireless communication terminal.

The AP performs MLA transmission with the STA1. The MLA transmission is communication using a plurality of links (a link L1 and a link L2 in a case of FIG. 1). The AP performs non-MLA transmission with the STA2. The non-MLA transmission is communication using a single link (the link L2 in a case of FIG. 1).

Here, the links may be in different bands. In this case, the bands to be used are, for example, a 2.4 GHz band, a 5 GHz band, a 6 GHz band, and a 920 MHz band. Further, the links may have a plurality of different channels in the same band. The number of the plurality of links is not limited to two, and may be three or more.

The AP sets a multi-link aggregation period (MLA period) which is a period in which the AP prioritizes the MLA transmission and does not prioritize the non-MLA transmission. The AP generates information (an MLA period setup element) and sends notification of the MLA period setup element using each of the links. The MLA period setup element is information which is to be referred to by the STA performing the MLA transmission and which is related to setting of the MLA transmission including information related to the MLA period. At this time, information (a non-MLA period setup element) is also generated and notification of the non-MLA period setup element is sent using each of the links. The non-MLA period setup element is information which is to be referred to by the STA performing the non-MLA transmission and which is related to setting of the non-MLA transmission.

The MLA period setup element notification may be sent using each of the links as described above, or may be sent using only a single link (e.g., sent to the STA by using only the link L2). Similarly, the non-MLA period setup element notification may be sent using each of the links, or may be sent using only a single link.

The STA1 that has received the MLA period setup element and the non-MLA period setup element sets a communication method (e.g., waiting time or a transmission period) during the MLA period, on the basis of the MLA period setup element. The STA1 performs the MLA transmission to the AP on the basis of the set waiting time and the set transmission period.

The STA2 that has received the MLA period setup element and the non-MLA period setup element sets, during the MLA period, a communication method (e.g., waiting time or a transmission period) on the basis of the non-MLA period setup element. The STA1 performs the non-MLA transmission to the AP on the basis of the set waiting time and the set transmission period.

The AP includes a wireless communication device 11 that performs the MLA transmission or the non-MLA transmission to the STA1 and the STA2. The STA1 and the STA2 respectively include a wireless communication terminal 12-1 and a wireless communication terminal 12-2 that belong to a network managed by the AP. The wireless communication terminals 12-1 and 12-2 are each referred to as wireless communication terminal 12 in a case where it is not particularly necessary to distinguish them from each other.

It is to be noted that the number of wireless communication devices and the number of wireless communication terminals in FIG. 1 are examples, and are not limited to those in FIG. 1. Further, an example is given in FIG. 1 that the STA1 performs the MLA transmission and the STA2 performs the non-MLA transmission; however, the STA1 may perform the non-MLA transmission and the STA2 may perform the MLA transmission depending on a situation.

<Configuration Example of Wireless Communication Device>

Figure 2:
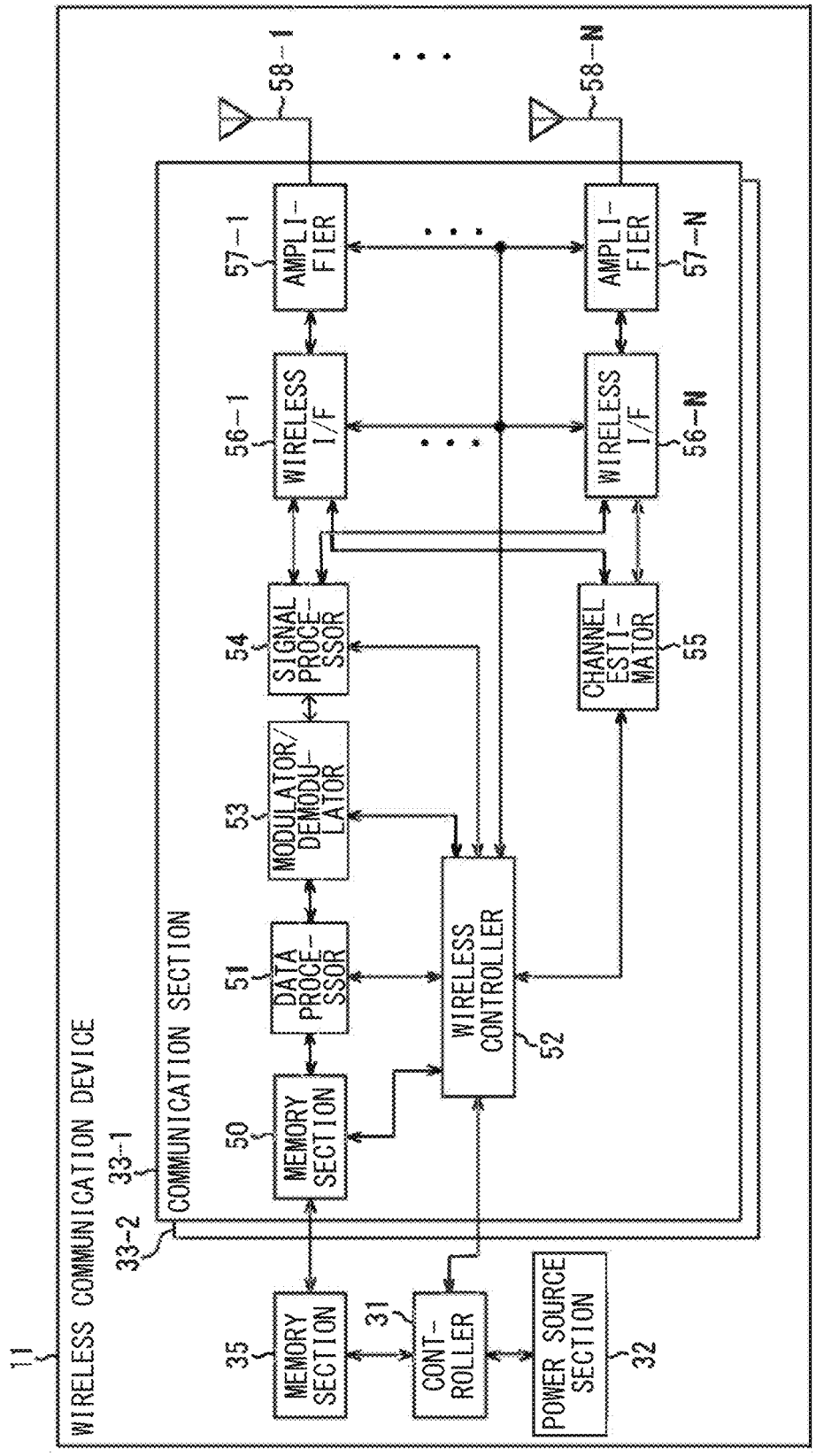
FIG. 2 is a block diagram illustrating a configuration example of a wireless communication device.

FIG. 2 is a block diagram illustrating a configuration example of the wireless communication device.

The wireless communication device 11 illustrated in FIG. 2 is a device that operates as the AP.

The wireless communication device 11 includes a controller 31, a power source section 32, communication sections 33-1 and 33-2, and a memory section 35. The communication sections 33-1 and 33-2 may perform control and information exchange directly with each other.

It is to be noted that the controller 31, and the communication sections 33-1 and 33-2 may be configured as one or more LSIs. Further, in a case where it is not necessary to distinguish the communication sections 33-1 and 33-2 from each other, they are each simply referred to as communication section 33 as appropriate. The number of communication sections 33 is not limited to two, and may be three or more.

The communication section 33 transmits and receives data. The communication section 33 includes a memory section 50, a data processor 51, a wireless controller 52, a modulator/demodulator 53, a signal processor 54, a channel estimator 55, wireless interfaces (I/F) 56-1 to 56-N, and amplifiers 57-1 to 57-N. Each communication section 33 may be an independent component or may be a component in which a portion thereof is shared between the communication sections 33. For example, the memory section 50, the data processor 51, the wireless controller 52, the modulator/demodulator 53 may be shared.

The wireless I/Fs 56-1 to 56-N, the amplifiers 57-1 to 57-N, and the antennas 58-1 to 58-N may be divided into groups, each group including components having the same branch number, and each group may be regarded as one component. Further, functions of the amplifiers 57-1 to 57-N may be included in the wireless I/Fs 56-1 to 56-N.

Further, in a case where it is not necessary to distinguish the wireless I/Fs 56-1 to 56-N from each other, the amplifiers 57-1 to 57-N from each other, and the antennas 58-1 to 58-N from each other, they are each respectively simply referred to as wireless I/F 56, amplifier 57, and antenna 58, as appropriate.

The controller 31 includes a CPU (Central Processing Unit), a ROM (Read Only Memory), a RAM (Random Access Memory), etc. The controller 31 executes a program stored in the ROM, etc., and controls the power source section 32, and the wireless controller 52 of each communication section 33.

The power source section 32 includes a battery or a fixed power source, and supplies electric power to the entire wireless communication device 11.

The memory section 50 holds data inputted from an upper layer such as an application layer, and outputs the data to the data processor 51. Further, the memory section 50 holds data supplied from the data processor 51 and outputs the data to the upper layer. A portion of the memory section 50 is placed, as the memory section 35, outside the communication section 33 but inside the wireless communication device 11.

Upon transmission, the data processor 51 uses the data supplied from the memory section 50 to generate a packet for wireless communication. The data processor 51 adds a header for media access control (MAC) and adds an error detection code to the generated packet, and outputs the processed data to the modulator/demodulator 53.

Upon reception, the data processor 51 performs analysis of a MAC header, detection of a packet error, a reorder process on the data supplied from the modulator/demodulator 53, and outputs the processed data to the memory section 50.

The wireless controller 52 passes information between the sections of wireless communication device 11 and controls the sections in the communication section 33.

The wireless controller 52 performs, upon transmission, parameter setting in the modulator/demodulator 53 and the signal processor 54, scheduling of a packet in the data processor 51, and parameter setting and transmission power control of the wireless I/F 56 and the amplifier 57, as necessary. The wireless controller 52 performs, upon reception, parameter setting in the modulator/demodulator 53 and the signal processor 54, and parameter setting of the wireless I/F 56 and the amplifier 57, as necessary.

Further, in particular, the wireless controller 52 controls the communication section 33 to set the MLA period, generate the MLA period setup element, and send the notification using each of the links. Further, the wireless controller 52 controls the communication section 33 to generate the non-MLA period setup element and send the notification using each of the links.

The wireless controller 52 sets, during MLA period, the waiting time and the transmission period on the basis of the MLA period setup element or the non-MLA period setup element that has been generated. The wireless controller 52 controls the communication section 33 to perform the MLA transmission or the non-MLA transmission to the STA on the basis of the set waiting time or the set transmission period.

It is to be noted that at least some of actions of the wireless controller 52 may be performed by the controller 31 instead of the wireless controller 52. Further, the controller 31 and the wireless controller 52 may be configured as one component.

Upon transmission, the modulator/demodulator 53 performs encoding, interleaving, and modulation on the data supplied from the data processor 51 on the basis of an encoding scheme and a modulation scheme set by the controller 31, and generates a data symbol stream. The modulator/demodulator 53 outputs the generated data symbol stream to the signal processor 54.

Upon reception, the modulator/demodulator 53 outputs data obtained by performing demodulating, deinterleaving, and decoding on the data symbol stream supplied from the signal processor 54, to the data processor 51 or the wireless controller 52.

Upon transmission, the signal processor 54 performs, as necessary, signal processing to be subjected to spatial separation on the data symbol stream supplied from the modulator/demodulator 53, and outputs one or more transmission symbol streams obtained as a result of the signal processing to each wireless I/F 56.

Upon reception, the signal processor 54 performs signal processing on the received symbol stream supplied from each wireless I/F 56, performs spatial separation of the stream as necessary, and outputs a data symbol stream obtained as a result of the spatial separation to the modulator/demodulator 53.

The channel estimator 55 calculates complex channel gain information of a propagation path from a preamble portion and a training signal portion of the received symbol stream supplied from each wireless I/F 56. The complex channel gain information is supplied to the modulator/demodulator 53 and the signal processor 54 via the wireless controller 52, and is used for the demodulating process in the modulator/demodulator 53 and the spatial separation in the signal processor 54.

Upon transmission, the wireless I/F 56 converts the transmitted symbol stream from the signal processor 54 into an analog signal, performs filtering, up-conversion to a carrier frequency, and phase control, and outputs the phase-controlled analog signal to the amplifier 57.

Upon reception, the wireless I/F 56 performs phase control, down-conversion, and inverse filtering on the analog signal supplied from the amplifier 57, and outputs a received symbol stream resulting from the conversion into a digital signal to the signal processor 54 and the channel estimator 55.

Upon transmission, the amplifier 57 amplifies the analog signal supplied from the wireless I/F 56 up to a predetermined electric power, and outputs the analog signal whose electric power is amplified up to the predetermined electric power to the antenna 58. Upon reception, the amplifier 57 amplifies the analog signal supplied from the antenna 58 up to a predetermined electric power, and outputs the analog signal whose electric power is amplified up to the predetermined electric power the wireless I/F 56.

At least a portion of a function at the time of transmission, a function at the time of reception, or both, of the amplifier 57 may be included in the wireless I/F 56. Further, at least a portion of at least one of the functions of the amplifier 57 may be a component outside the communication section 33.

It is to be noted that a configuration of the wireless communication terminal 12 that operates as the STA is basically similar to that of the wireless communication device 11; accordingly, the configuration of the wireless communication device 11 is used below for the description of the wireless communication terminal 12.

In a case of operating as the STA, the wireless controller 52 sets, during the MLA period, the waiting time and the transmission period on the basis of the MLA period setup element or the non-MLA period setup element received from the AP. The wireless controller 52 controls the communication section 33 to perform the MLA transmission or the non-MLA transmission to the AP on the basis of the set waiting time or the set transmission period.

1. First Embodiment (an Example in which Notification is Sent from an AP)

First, as a first embodiment, an example will be described of MLA-prioritized transmission in which notification of the MLA period setup element and the non-MLA period setup element is sent from the AP and the MLA transmission is prioritized.

<Sequence Example of MLA-Prioritized Transmission According to Present Technology>

Figure 3:
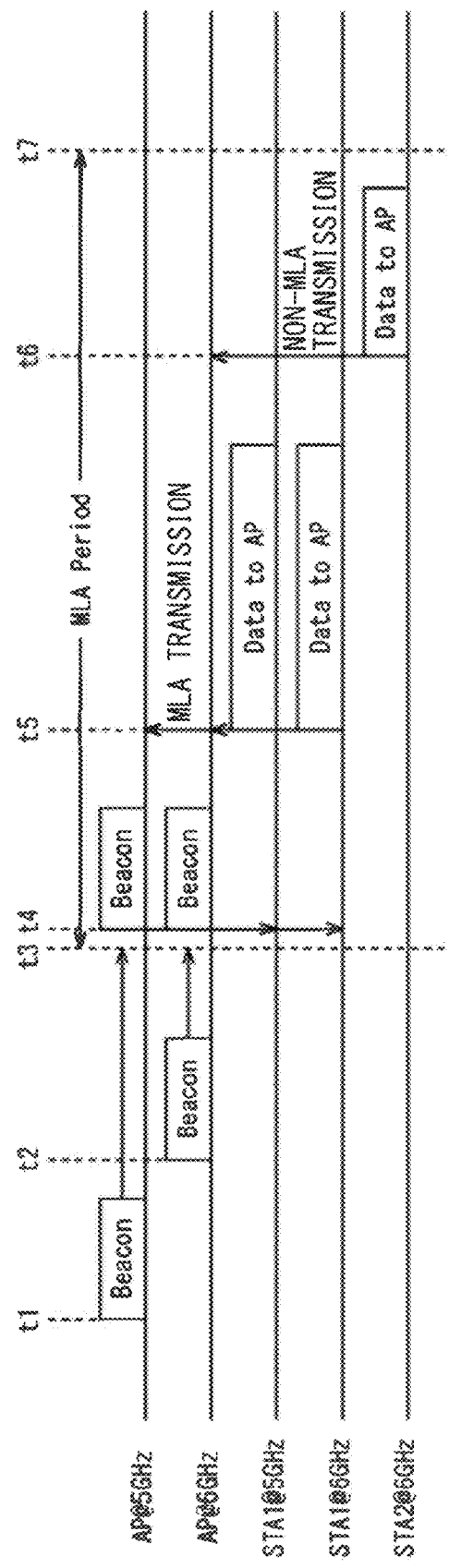
FIG. 3 is a diagram illustrating a sequence of MLA-prioritized transmission according to a first embodiment of the present technology.

FIG. 3 is a diagram illustrating a sequence that describes a series of actions of the MLA-prioritized transmission according to the first embodiment of the present technology.

In FIG. 3, the link L1 is the 5 GHz band, the link L2 is the 6 GHz band, and transmission sequences of the AP, the STA1, and the STA2 are indicated for each link. In other words, FIG. 3 illustrates an example in which the AP and the STA1 perform the MLA transmission with each other using the link L1 and the link L2, and the STA2 performs the non-MLA transmission to the AP using the link L2.

The AP sets the MLA period and sends the notification of the MLA period setup element and the non-MLA period setup element. FIG. 3 illustrates an example in which a period from time t3 to time t7 is set as the MLA period.

At time t1, the AP uses the 5 GHz band to transmit the MLA period setup element and the non-MLA period setup element, for example, in a beacon.

The MLA period setup element includes an MLA EDCA (Enhanced Distributed Channel Access) parameter to be used during the MLA period, and time information of the MLA period.

The non-MLA period setup element includes a non-MLA EDCA parameter to be used during the MLA period. It is to be noted that the MLA EDCA parameter and the non-MLA EDCA parameter may each be set for each access category (AC) information indicating a data type and a data priority, or may be set for each link information. The MLA EDCA parameter and the non-MLA EDCA parameter may each be transmitted for each set link information or for each AC information. In FIG. 3, each of the link L1 and the link L2 is handled as separate link information, and a different parameter is set for each link information. However, when notification is sent by an element, one piece of link information may indicate a combination of the link L1 and the link L2.

At time t2, the AP uses the 6 GHz band to transmit the MLA period setup element and the non-MLA period setup element, for example, in a beacon. A reason why the transmission time of the beacon in the 5 GHz band and the transmission time of the beacon in the 6 GHz band are different from each other is that the beacons are transmitted at timings at which respective transmission opportunities are obtained.

During the MLA period, in a case of performing the MLA transmission, the STA1 and the STA2 that have received the MLA period setup element and the non-MLA period setup element use the MLA EDCA parameter to set the waiting time and the transmission period on the basis of the MLA EDCA parameter. During the MLA period, in a case of performing the non-MLA transmission, the STA1 and the STA2 use the non-MLA EDCA parameter to set the waiting time and the transmission period on the basis of the non-MLA EDCA parameter.

At time t3, the MLA period is started.

At time t4 during the MLA period which is the set waiting time or the set transmission period, the AP uses the 5 GHz band and the 6 GHz band to transmit beacons. Thus, during the MLA period, the AP may simultaneously transmit the beacons using the links.

The STA1 performs the MLA transmission of data to the AP using the 5 GHz band and the 6 GHz band at time t5. It is to be noted that, during the MLA period, reception of the beacons at time t4 may trigger the MLA transmission. This may allow the AP to prioritize the MLA transmission.

At time t6 which is after the MLA transmission of the STA1 is completed, the STA2 uses the 6 GHz band to perform the non-MLA transmission of data to the AP.

At time t7 which is after the non-MLA transmission of the STA2 is completed, the MLA period ends.

It is to be noted that the AP, the STA1, and the STA2 may check with each other in advance such as at time of connection, capability information related to whether the MLA transmission is possible and whether setting of the MLA period and setting of the MLA EDCA parameter are possible.

Further, in FIG. 3, the information related to the setting of the MLA period is included in the beacon and transmitted; however, the information may be included in a probe response frame or the like to be transmitted in response to a probe request frame and transmitted.

In addition, during the MLA period of FIG. 3, the AP1 is able to simultaneously transmit the beacons using the links, as has been performed at time t4. As a result, it is also possible to implement operation that is to be performed immediately after transmitting the beacon, such as broadcast or multicast, in the MLA transmission using the plurality of links, as has been performed at time t5.

<Configuration Example of MLA Period Setup Element>

Figure 4:
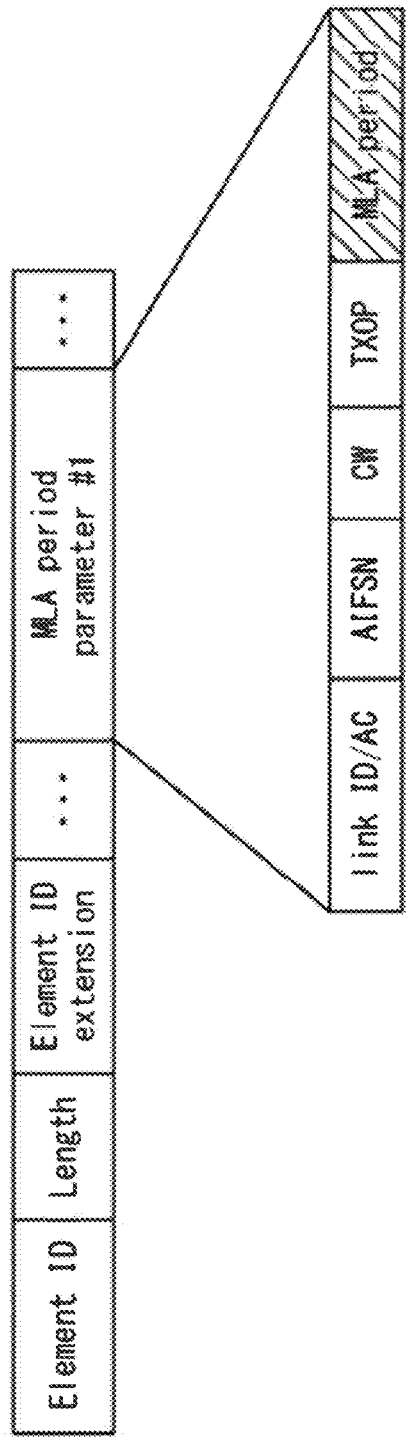
FIG. 4 is a diagram illustrating a configuration example of an MLA period setup element.

FIG. 4 is a diagram illustrating a configuration example of the MLA period setup element.

In FIG. 4, the MLA period setup element includes respective fields of Element ID, Length, Element ID extension, . . . , MLA period parameter #1 (a first parameter), . . . .

In each the respective fields of Element ID and Element ID extension, information which is different from each other is written. The information written in the field of Element ID and the information written in the field of Element ID extension indicate that the element is the MLA period setup element.

In the field of Length, information related to a length of the element is written.

In the field of MLA period parameter #1, the MLA EDCA parameter and the time information of the MLA period are written. It is to be noted that #1 indicates that MLA period parameter exists for each link information or for each AC information, and that MLA period parameter after #2 may exist.

Specifically, the field of MLA period parameter includes respective fields of link ID/AC, (AIFSN (Arbitration Inter Frame Space Number), CW (Contention Window), TXOP (Transmission Opportunity), and MLA period. In other words, link ID/AC, AIFSN, CW, and TXOP are each the MLA EDCA parameter. AIFSN, CW, and TXOP are each a parameter related to acquisition of a transmission opportunity.

In the field of link ID/AC, at least one of corresponding link information or AC information is written. The link information may be information that identifies one link or information that identifies one of a plurality of link combinations. The AC information is information that identifies one of four ACs: AC_VO (Voice); AC_VI (Video); AC_BE (Best Effort); and AC_BK (Back Ground).

In the field of AIFSN, AIFSN to be used during the MLA period is written. AIFSN is information related to a frame transmission interval. With decrease in a value thereof, priority of a queue waiting for transmission increases; therefore, the AP is set in such a manner that the value of the case of the MLA EDCA parameter is smaller than a value of the case of the non-MLA EDCA parameter.

In the field of CW, $CW_{min}$ and $CW_{max}$ to be used during the MLA period are written. $CW_{min}$ and $CW_{max}$ are a minimum value and a maximum value, respectively, of CW. CW is a parameter related to transmission waiting time. With a decrease in the transmission waiting time, a probability of obtaining a transmission opportunity of the queue increases; therefore, the AP performs the setting in such a manner that the value in the case of the MLA EDCA parameter is smaller than the value in the case of the non-MLA EDCA parameter.

In the field of TXOP, information related to TXOP to be used during the MLA period, e.g., a TXOP limit which is an upper limit of TXOP, is written. TXOP is occupation time of a channel. With an increase in a value thereof, it is possible to transfer more frames in one obtained transmission opportunity; therefore, AP performs the setting in such a manner that the value in the case of the non-MLA EDCA parameter is smaller than the value in the case of the MLA EDCA parameter.

In the field of MLA period, time information of the MLA period is written. For example, start time of the MLA period and a length of the MLA period are listed as the time information.

<Configuration Example of Non-MLA Period Setup Element>

Figure 5:
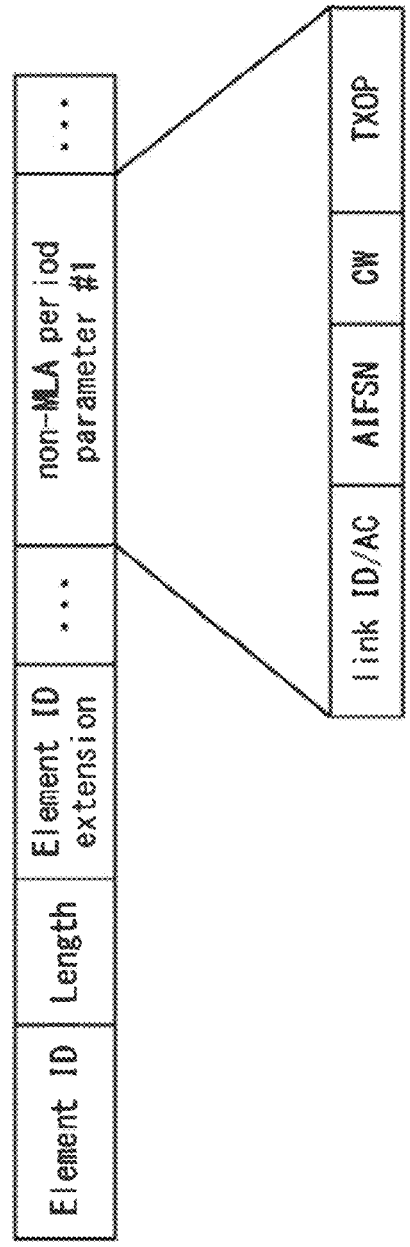
FIG. 5 is a diagram illustrating a configuration example of a non-MLA period setup element.

FIG. 5 is a diagram illustrating a configuration example of the non-MLA period setup element.

In FIG. 5, the non-MLA period setup element includes respective fields of Element ID, Length, Element ID extension, . . . , non-MLA period parameter #1 (a second parameter), . . . .

It is to be noted that description of a portion of the configuration illustrated in FIG. 5 that is the same as a portion of the configuration illustrated in FIG. 4 is omitted as appropriate.

Non-MLA period parameter of FIG. 5 differs from MLA period parameter of FIG. 4 in that MLA period is removed. That is, non-MLA period parameter includes the non-MLA EDCA parameter. It is to be noted that, instead of non-MLA period parameter, it is also possible to use an existing EDCA parameter.

Here, at least one of AIFSN, $CW_{min}$, $CW_{max}$, and TXOP may be written as the MLA EDCA parameter and the non-MLA EDCA parameter.

Further, the start time and the length of the MLA period written in the MLA period setup element, and the MLA EDCA parameter may be decided by the AP collecting buffer status report from the STAs and determining a traffic status. A criterion for the decision is, for example, the number of STAs which are known to have traffic on the basis of the buffer status reports. The same applies to the non-MLA period setup element.

In order to terminate the MLA period and return to normal communication during the MLA period time written in the MLA period setup element, the AP may transmit a frame in which end time of the MLA period is written or a frame in which the length of the MLA period is written as 0 to the field of MLA period and send the notification to subordinate STAs.

The STA may determine by itself which of TXOP, CW, and AIFSN to use in the notified MLA EDCA parameter and non-MLA EDCA parameter, or the AP may specify which of those is to be used.

It is to be noted that, although FIG. 4 and FIG. 5 illustrate examples in which the MLA period setup element and the non-MLA period setup element are separately configured, the MLA period setup element and the non-MLA period setup element may be configured in the same element. In this case, it is possible to distinguish them from each other by Element ID and Element ID extension.

<Format Example of Data for Case of MLA Transmission>

Figure 6:
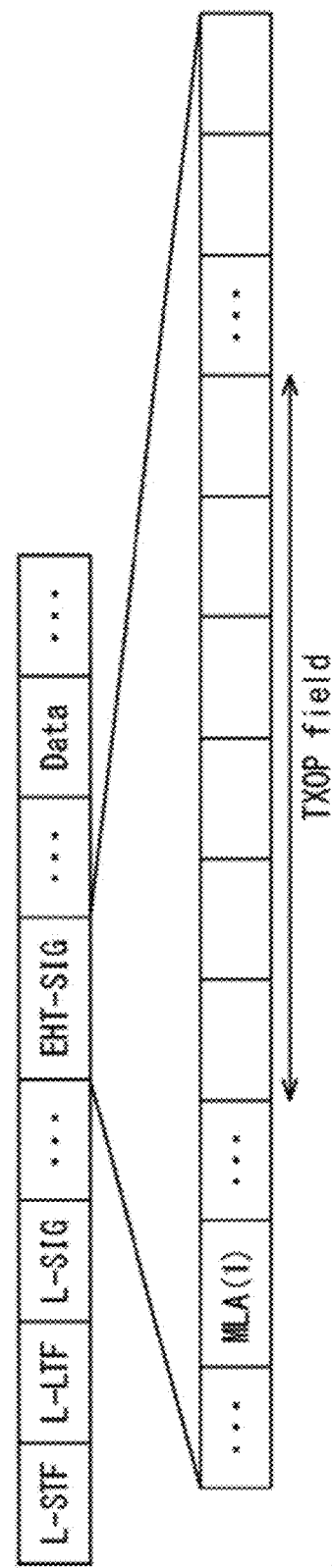
FIG. 6 is a diagram illustrating a format example of data for a case of MLA transmission.

FIG. 6 is a diagram illustrating a format example of data for a case of the MLA transmission.

FIG. 6 illustrates a format example of PPDU (PLCP (Physical Layer Convergence Protocol) Protocol Data Unit) as data for the case of the MLA transmission.

PPDU includes L-STF, L-LTF, L-SIG, EHT-SIG, . . . , Data, . . . . It is to be noted that, in FIG. 6, description a configuration that is the same as a configuration of existing PPDU is omitted. The same applies to the subsequent drawings.

EHT-SIG includes a plurality of fields including an MLA field, a TXOP field, and the like.

In the MLA field, information indicating the MLA transmission or the non-MLA transmission is written. In a case of FIG. 6, "1" indicating the MLA transmission is written in the MLA field.

Further, in EHT-SIG, 6 bits are used as the TXOP field. The 6 bits used as the TXOP field is one example, and the number of bits is not limited to 6.

<Format Example of Data for Case of Non-MLA Transmission>

Figure 7:
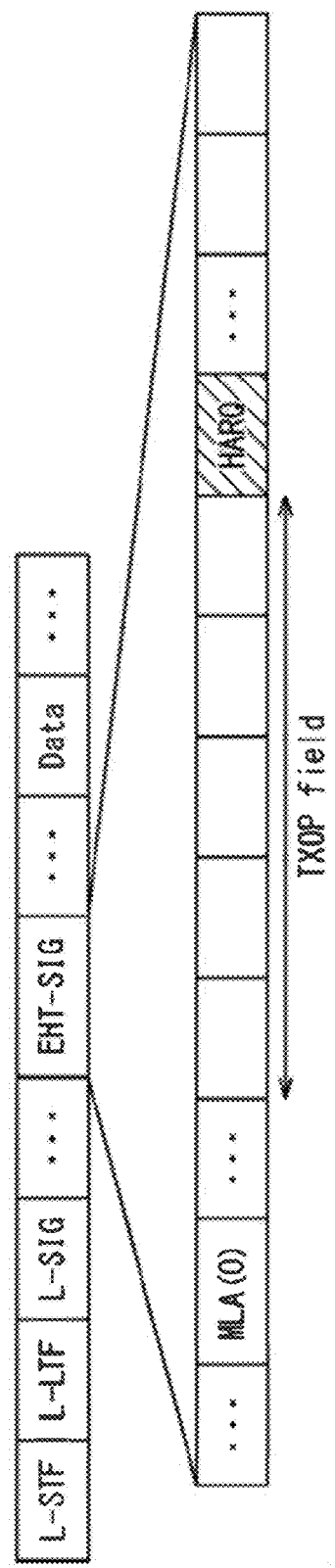
FIG. 7 is a diagram illustrating a format example of data for a case of non-MLA transmission.

FIG. 7 is a diagram illustrating a format example of data for a case of the non-MLA transmission.

FIG. 7 illustrates a format example of PPDU as data for the case of the non-MLA transmission.

In a case of FIG. 7, "0" indicating the non-MLA transmission is written in the MLA field of EHT-SIG.

Further, in the case of FIG. 7, 5 bits are used as the TXOP field in EHT-SIG. The remaining 1 bit, which is in the TXOP field in the data for the MLA transmission of FIG. 6, is used as a field indicating communication using HARQ (Hybrid Automatic Repeat Request).

A reason for this is that, in a case where TXOP is used for the non-MLA EDCA parameter, a TXOP length of the non-MLA transmission is limited. For example, FIG. 7 illustrates an example in which, in the case of the non-MLA transmission, the TXOP length is limited by not using the least significant bit of the TXOP field as information of the TXOP length.

In this case, it is possible to use a bit that is not used as the TXOP field as a field indicating another piece of information, as in the case of FIG. 7, in which a bit that is not used as the TXOP field is used as a field indicating communication using HARQ.

It is possible to use, as information other than HARQ, the following pieces of information: information which prohibits performances of transmission at the same time during spatial reuse in the non-MLA transmission; redundant information for error checking by CRC; information related to the number of connections; information related to coding; and the like.

This makes it possible to perform, in the non-MLA transmission, more reliable communication in return for limitation on the TXOP limit.

<Operation Example of AP>

Figure 8:
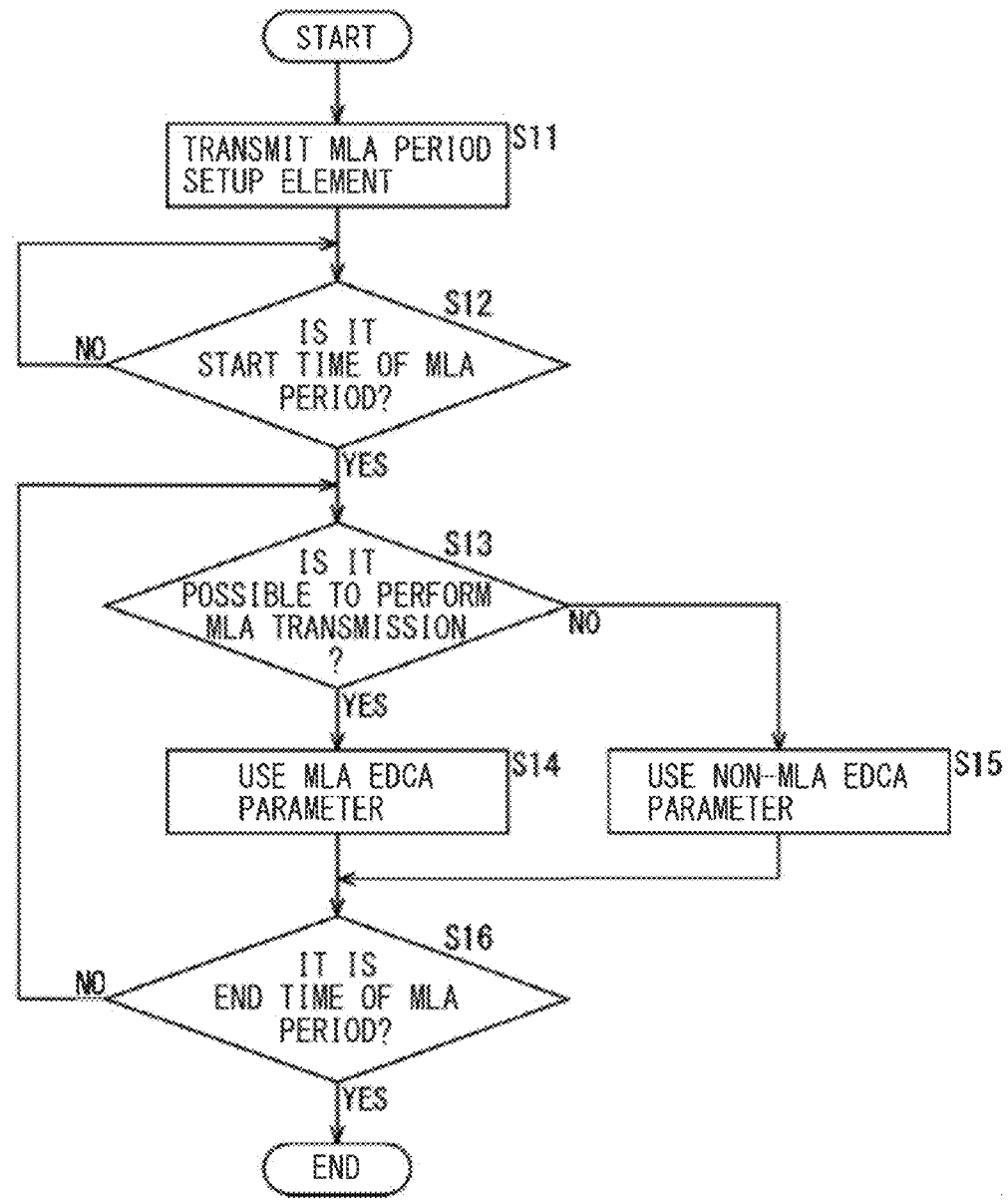
FIG. 8 is a flowchart for explaining an example of an MLA-prioritized transmission process performed by an AP.

FIG. 8 is a flowchart for explaining an example of an MLA-prioritized transmission process performed by the AP.

In step S11, the wireless controller 52 sets the MLA period, generates the MLA period setup element in which the MLA period is set, and causes the communication section 33 to transmit the generated MLA period setup element using each of the links. It is to be noted that the MLA period setup element may be transmitted using each of the links, and may also be transmitted using only one link. At this time, the non-MLA period setup element is also generated and transmitted.

In step S12, the wireless controller 52 waits until it is determined to be start time of the set MLA period. If it is determined in step S12 to be the start time of the MLA period, the process proceeds to step S13.

In step S13, the wireless controller 52 selects a STA and determine whether the selected STA is able to perform the MLA transmission. If it is determined in step S13 that the STA is able to perform the MLA transmission, the process proceeds to step S14. It is to be noted that criteria for the determination in step S13 are, for example, whether the STA knows that the plurality of links is usable by exchanging capability information during connection, whether communication is performed with the STA using the plurality of links immediately preceding moment, whether each link of the STA is in an awake state or in a sleep state, whether each link is enabled or disabled, and the like.

In step S14, the wireless controller 52 uses the MLA EDCA parameter to set the waiting time and the transmission period on the basis of the MLA EDCA parameter. The wireless controller 52 controls the communication section 33 to perform the MLA transmission to the STA on the basis of the set waiting time and the set transmission period.

In step S13, if it is determined that the STA is not able to perform the MLA transmission, the process proceeds to step S15. The wireless controller 52 uses the non-MLA EDCA parameter to set the waiting time and the transmission period on the basis of the non-MLA EDCA parameter. The wireless controller 52 controls the communication section 33 to perform the non-MLA transmission to the STA on the basis of the set waiting time and the set transmission period.

After step S14 or S15, the process proceeds to step S16.

In step S16, the wireless controller 52 determines whether it is the end time of the MLA period. If it is determined in step S16 that it is not the end time of the MLA period, the process returns to step S13 and the subsequent steps are repeated.

If it is determined in step S16 that the it is the end time of the MLA period, the MLA-prioritized transmission process ends.

It is to be noted that, in FIG. 8, steps S13 to S15 are performed for the number of times that is equal to the number of subordinate STAs.

<Operation Example of STA>

Figure 9:
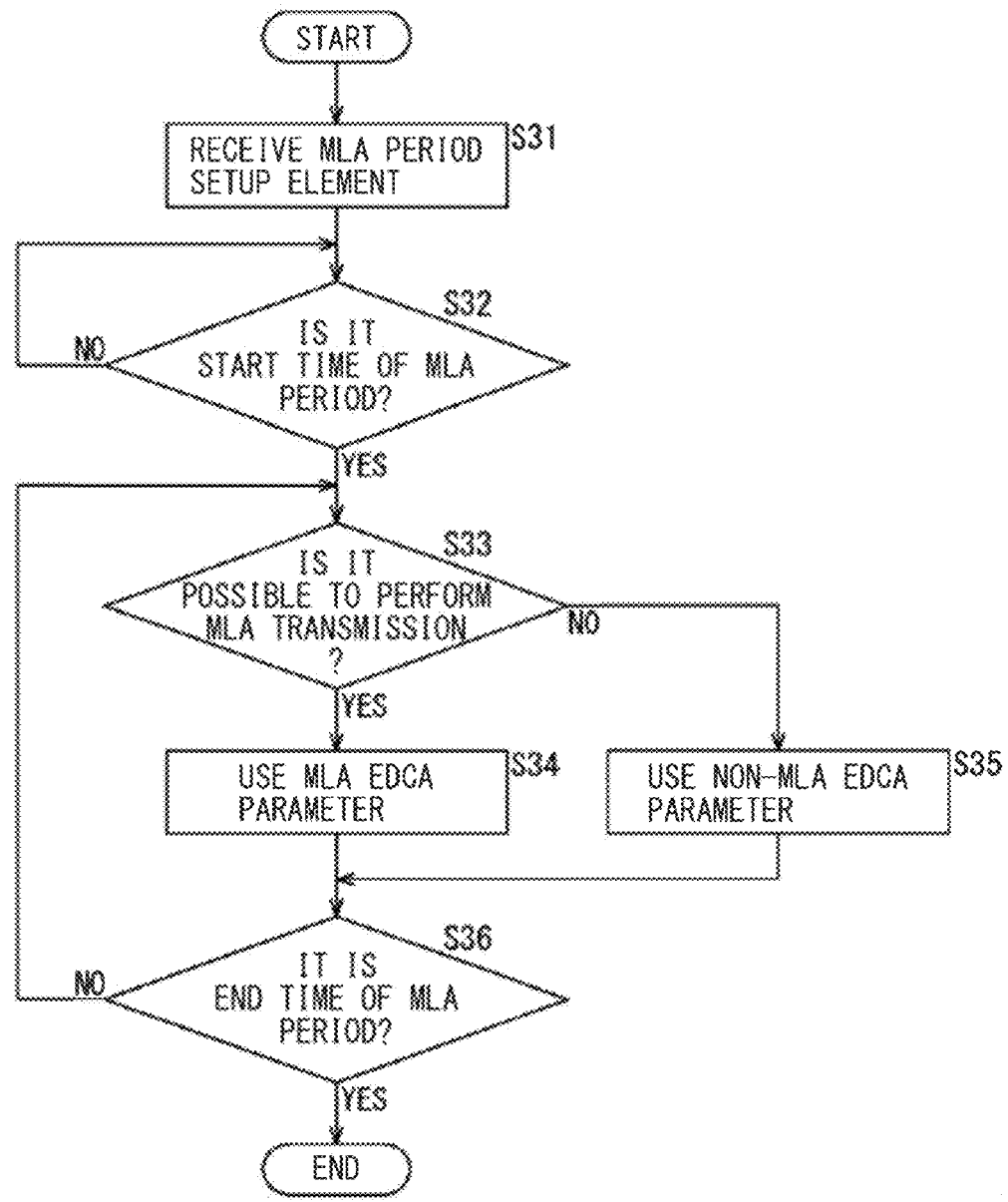
FIG. 9 is a flowchart for explaining an example of an MLA-prioritized transmission process performed by a STA.

FIG. 9 is a flowchart for explaining an example of an MLA-prioritized transmission process performed by the STA.

In step S31, the communication section 33 receives the MLA period setup element in which the MLA period has been set that is transmitted from the AP. The MLA period setup element is supplied to the wireless controller 52. In addition, the non-MLA period setup element is also received, and is supplied to the wireless controller 52.

In step S32, the wireless controller 52 refers to the MLA period setup element, and waits until it is determined to be the start time of the MLA period. If it is determined in step S32 to be the start time of the MLA period, the process proceeds to step S33.

In step S33, the wireless controller 52 determines whether the STA itself is able to perform the MLA transmission. If it is determined in step S33 that the STA itself is able to perform the MLA transmission, the process proceeds to step S34. It is to be noted that criteria for the determination in step S33 are, for example, whether the STA itself is compatible with multi-link transmission, whether two or more links are enabled, whether two or more links are each in an awake state, and the like.

In step S34, the wireless controller 52 uses the MLA EDCA parameter to set the waiting time and the transmission period on the basis of the MLA EDCA parameter. The wireless controller 52 controls the communication section 33 to perform the MLA transmission to the AP on the basis of the set waiting time and the set transmission period.

If it is determined in step S33 that the STA itself is not able to perform the MLA transmission, the process proceeds to step S35. The wireless controller 52 uses the non-MLA EDCA parameter to set the waiting time and the transmission period on the basis of the non-MLA EDCA parameter. The wireless controller 52 controls the communication section 33 to perform the non-MLA transmission to the AP on the basis of the set waiting time and the set transmission period.

After step S34 or S35, the process proceeds to step S36.

In step S36, the wireless controller 52 determines whether it is the end time of the MLA period. If it is determined in step S36 that it is not the end time of the MLA period, the process returns to step S33 and the subsequent steps are repeated.

If it is determined in step S36 that the it is the end time of the MLA period, the MLA-prioritized transmission process ends.

2. Second Embodiment (an Example in which a Request is Sent from a STA)

Next, as a second embodiment, an example will be described of an MLA-prioritized transmission process in which the AP sends notification of the MLA period setup element and the non-MLA period setup element in response to a request transmitted from the STA, and prioritizes the MLA transmission.

<Sequence Example of MLA-prioritized Transmission Process According to Present Technology>

Figure 10:
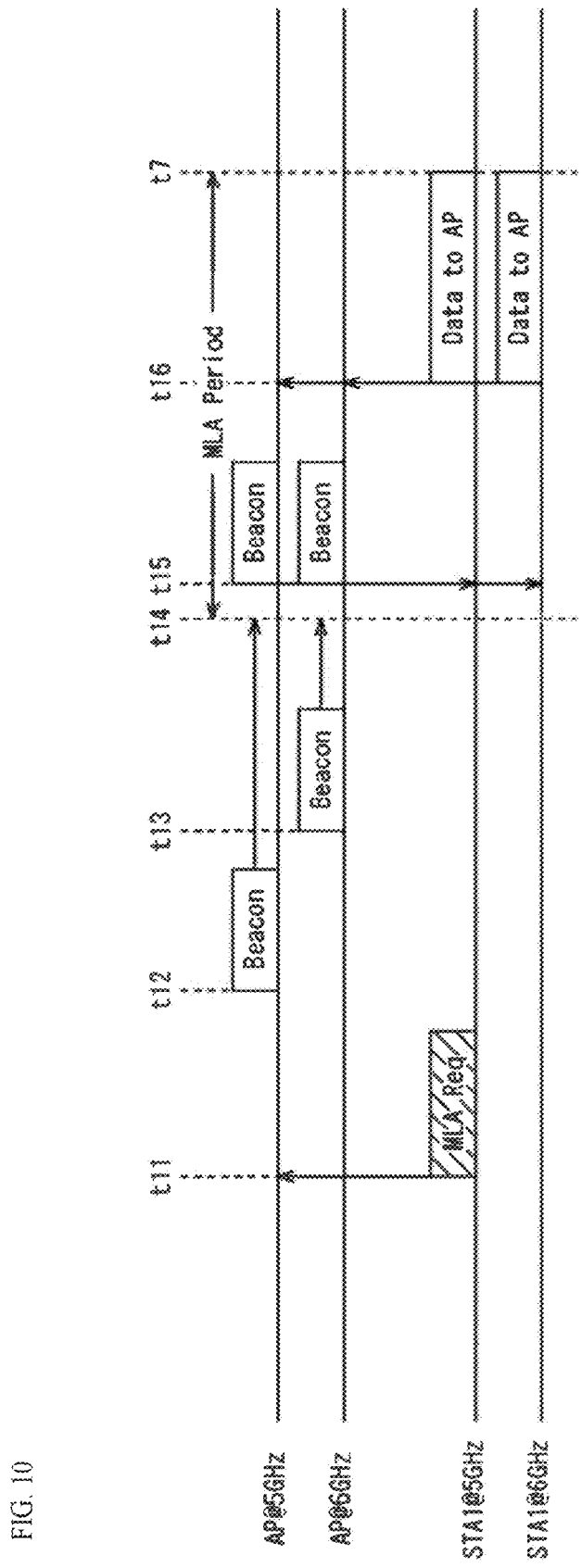
FIG. 10 is a diagram illustrating a sequence of MLA-prioritized transmission according to a second embodiment of the present technology.

FIG. 10 is a diagram illustrating a sequence that describes a series of actions of the MLA-prioritized transmission according to the second embodiment of the present technology.

In FIG. 10, similarly as the example of FIG. 3, the link L1 is the 5 GHz band, the link L2 is the 6 GHz band, and transmission sequences of the AP and the STA1 are indicated for each link. It is to be noted that, in FIG. 10, illustration of transmission sequences of the STA2 are omitted.

At time t11, the STA1 uses the 5 GHz band to transmit a frame including information (an MLA period request element) that requires setting of the MLA period to the AP.

The MLA period request element includes start time and a length of the MLA period that the STA1 desires, and an EDCA parameter that the STA1 desires to use during the MLA period. The MLA period request element includes at least one of the MLA EDCA parameter, the MLA EDCA parameter, or the MLA period.

If the AP receives the MLA period request element transmitted from the STA1, the AP determines whether it is possible to set the MLA period on the basis of the MLA period request element. It is to be noted that criteria for the determination are, for example: whether or not there is a traffic state for a subordinate STA that operates using only a single link or traffic for which real-time performance is desired; and whether an MLA period setup element in which different start time, length, and EDCA parameter are written has already been received from another STA.

If the AP determines that it is possible to set the MLA period, the AP sets the MLA period and sends the notification of the MLA period setup element and the non-MLA period setup element. FIG. 10 illustrates an example in which a period from time t14 to time t17 is set as the MLA period.

At time t12, the AP uses the 5 GHz band to transmit the MLA period setup element and the non-MLA period setup element, for example, in a beacon. Further, at time t13, the AP uses the 6 GHz band to transmit the MLA period request element and the non-MLA period setup element, for example, in a beacon.

During the MLA period, in a case of performing the MLA transmission, the STA1 that has received the MLA period setup element and the non-MLA period setup element uses the MLA EDCA parameter to set the waiting time and the transmission period on the basis of the MLA EDCA parameter. During the MLA period, in a case of performing the non-MLA transmission, the STA1 uses the non-MLA EDCA parameter to set the waiting time and the transmission period on the basis of the non-MLA EDCA parameter.

At time t14, the MLA period is started.

At time t15 during the MLA period which is the set waiting time or the set transmission period, the AP uses the 5 GHz band and the 6 GHz band to transmit beacons during the set waiting time or the set transmission period. Thus, during the MLA period, the AP may simultaneously transmit the beacons using the links. As a result, it is possible to implement operation that is to be performed immediately after transmitting the beacon, such as multicast, in the MLA transmission using the plurality of links.

The STA1 performs, triggered by reception of the beacons at time t15, the MLA transmission of data to the AP using the 5 GHz band and the 6 GHz band at time t16. The MLA transmission is induced by such a trigger during the MLA period, which enables the AP to prioritize the MLA transmission.

At time t17 which is after the MLA transmission of the STA1 is completed, the MLA period ends.

It is to be noted that MLA period may be terminated early or the MLA period may be extended by the STA transmitting the MLA period request element during the MLA period.

Further, also in FIG. 10, the information related to the setting of the MLA period is included in the beacon and transmitted; however, the information may be included in a probe response frame or the like to be transmitted in response to a probe request frame, and transmitted.

<Configuration Example of MLA Period Request Element>

Figure 11:
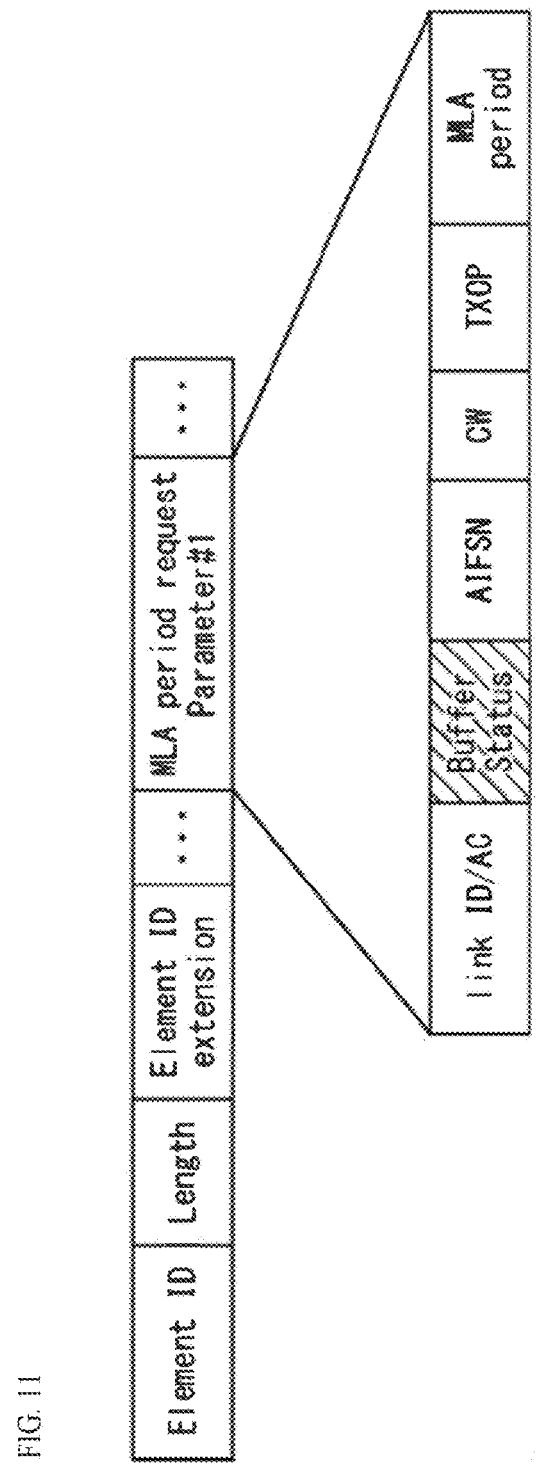
FIG. 11 is a diagram illustrating a configuration example of an MLA period request element.

FIG. 11 is a diagram illustrating a configuration example of the MLA period request element.

In FIG. 11, a field of the MLA period request element includes respective fields of Element ID, Length, Element ID extension, . . . , MLA period parameter #1, . . . .

In each of the respective fields of Element ID and Element ID extension, information indicating that the element is the MLA period request element is written.

In the field of Length, information related to a length of the element is written.

In the field of MLA period request parameter, the MLA EDCA parameter that the STA1 desires and time information of the MLA period that the STA1 desires are written.

The field of MLA period request parameter includes respective fields of link ID/AC, Buffer Status, AIFSN, CW, TXOP, and MLA period. Link ID/AC, Buffer Status, AIFSN, CW, and TXOP are each the MLA EDCA parameter.

In the field of link ID/AC, corresponding link information or AC information is written.

In the field of Buffer Status, a current self buffer status is written in order to send notification thereof to the AP.

In the field of AIFSN, AIFSN that is desired to be used during the MLA period is written.

In the field of CW, $CW_{min}$ and $CW_{max}$ that are desired to be used during the MLA period are written.

In the field of TXOP, a TXOP limit that is desired to be used during the MLA period is written.

In the field of MLA period, desired time information of the MLA period is written.

3. Others

<Effects>

As described above, in the present technology, the first parameter and the second parameter are transmitted. The first parameter is used for the setting of the communication in which the wireless communication terminal uses the plurality of links. The second parameter is used for the setting of the communication in which the wireless communication terminal uses the single link.

Accordingly, the value of the first parameter and the value of the second parameter may be set in such a manner that the communication using the plurality of links is prioritized.

For example, the value of AIFSN or CW in the first parameter is set less than the value of AIFSN or CW in the second parameter.

For example, the upper limit of TXOP in the first parameter is set longer than the upper limit of TXOP in the second parameter.

Further, information related to a predetermined period during which the wireless communication terminal performs communication on the basis of the setting using the first parameter is transmitted.

This allows more transmission opportunities for communication using the plurality of links than for communication using the single link.

It also makes it easier to transmit beacons simultaneously using the plurality of links. This facilitates the implementation of operation that occurs immediately after the beacon, such as multicast.

Further, during the communication using the single link, new information for reliable communication is written in the frame in return for limitation on the TXOP limit. This allows reliable communication to be performed even in the communication using the single link, and ensures fairness between communication attempting to use two or more links and communication attempting to use a single link.

<Configuration Example of Computer>

It is possible to execute the series of processes described above by hardware or software. In a case where the series of processes is executed by software, a program including the software is installed from a program recording medium on a computer incorporated in dedicated hardware, a general-purpose personal computer, or the like.

Figure 12:
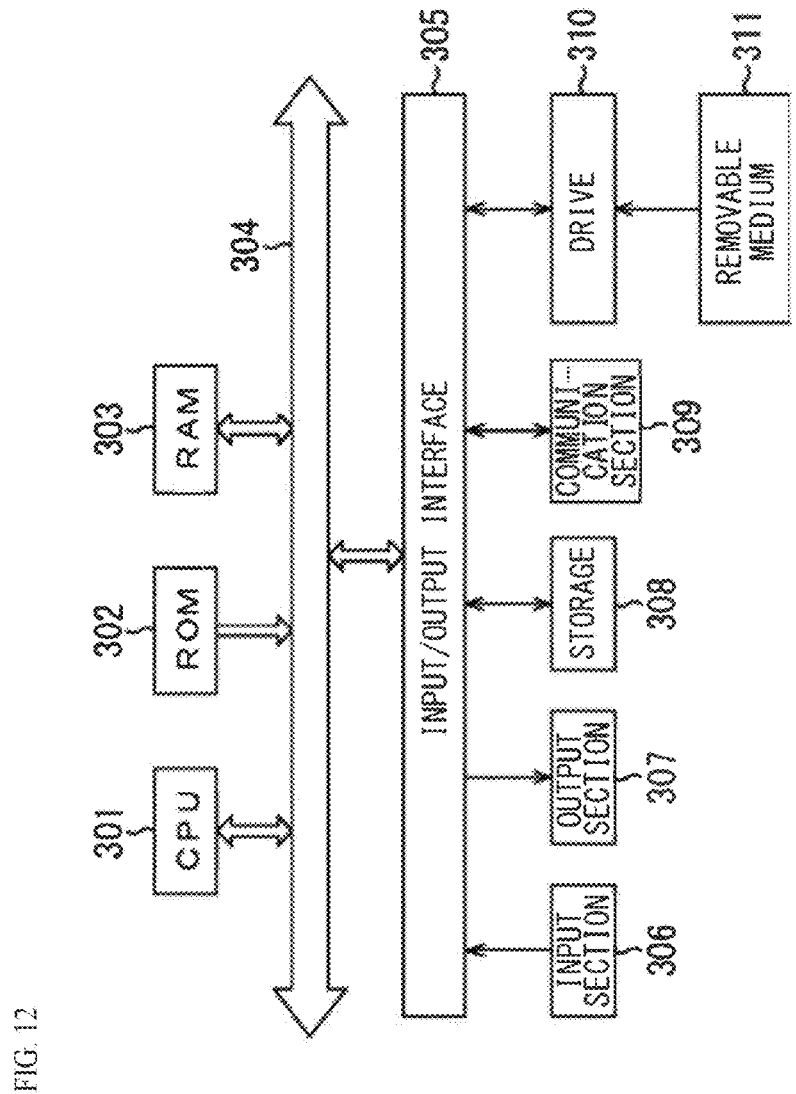
FIG. 12 is a block diagram illustrating a configuration example of a computer.

FIG. 12 is a block diagram illustrating a configuration example of hardware of a computer that executes, by using a program, the above-described series of processes.

A CPU (Central CPU (Central Processing Unit)) 301, a ROM (Read Only Memory) 302, and a RAM (Random Access Memory) 303 are coupled to each other via a bus 304.

Further, an input/output interface 305 is coupled to the bus 304. The input/output interface 305 is coupled to an input section 306 including a keyboard, a mouse, and the like, and an output section 307 including a display, a speaker, and the like. Further, coupled to the input/output interface 305 are: a storage 308 including a hard disk, a non-volatile memory, and the like; a communication section 309 including a network interface and the like; and a drive 310 that drives a removable medium 311.

In the computer configured as described above, the CPU 301 performs the above-described series of processes by, for example, loading the program stored in the storage 308 into the RAM 303 via the input/output interface 305 and the bus 304 and executing the program.

The program to be executed by the CPU 301 may be recorded on the removable medium 311, or provided via a wired or wireless transmission medium such as a local area network, the Internet, or digital broadcasting, and installed in the storage 308.

It is to be noted that the program to be executed by the computer may be a program in which processes are chronologically performed in the order described herein, or may be a program in which processes are performed in parallel or at necessary timing such as when the processes are invoked.

In this specification, the term "system" means a set of a plurality of components (devices, modules (parts), and the like), and it does not matter whether all the components are in the same housing. Therefore, the system may include both a plurality of devices stored in separate housings and coupled to each other via a network, and one device having a plurality of modules stored in one housing.

Further, the effects described in the present specification are merely illustrative and non-limiting, and other effects may be provided.

The embodiments of the present technology are not limited to the embodiments described above, and various modifications can be made without departing from the gist of the present technology.

For example, in the present technology, it is possible to adopt a configuration of cloud computing in which one function is distributed to a plurality of devices via a network and processed in cooperation.

In addition, it is possible to execute the steps described in the above flowcharts by one device, and it is also possible to share the steps between a plurality of devices and execute the steps.

Further, in a case where a plurality of processes is included in one step, it is possible to execute the plurality of processes included in the one step by one device, and it is also possible to share the processes between a plurality of devices and execute the processes.

<Combination Examples of Configurations>

The present technology may have the following configurations.

(1)

A wireless communication device including a communication section that transmits a first parameter and a second parameter, the first parameter being used for setting of communication in which a wireless communication terminal uses a plurality of links, the second parameter being used for setting of communication in which the wireless communication terminal uses a single link.

(2)

The wireless communication device according to (1), in which the first parameter includes a parameter related to a period in which the wireless communication terminal performs communication on a basis of setting using the first parameter or the second parameter.

(3)

The wireless communication device according to (2), in which the parameter related to the period includes start time of the period and a length of the period.

(4)

The wireless communication device according to (2), in which the parameter related to the period indicates an end of the period.

(5)

The wireless communication device according to (1), in which the first parameter and the second parameter each include a parameter related to acquisition of a transmission opportunity.

(6)

The wireless communication device according to (5), in which the first parameter and the second parameter each include, as the parameter related to the acquisition of the transmission opportunity, a parameter related to a frame transmission interval or a parameter related to transmission waiting time, and the frame transmission interval and the transmission waiting time are set to be smaller in the first parameter than in the second parameter.

(7)

The wireless communication device according to (5), in which the first parameter and the second parameter each include, as the parameter related to the acquisition of the transmission opportunity, a value related to occupation time of a channel, and the value related to the occupation time of the channel is set to be longer in the first parameter than in the second parameter.

(8)

The wireless communication device according to any one of (1) to (7), in which the communication section transmits the first parameter and the second parameter for each link information or for each access category information.

(9)

The wireless communication device according to any one of (1) to (7), in which the communication section transmits, as the second parameter, an existing EDCA (Enhanced Distributed Channel Access) parameter.

(10)

A wireless communication method performed by a wireless communication device, the wireless communication method including transmitting a first parameter and a second parameter, the first parameter being used for setting of communication in which a wireless communication terminal uses a plurality of links, the second parameter being used for setting of communication in which the wireless communication terminal uses a single link.

(11)

A wireless communication terminal including a communication section that performs communication on a basis of setting using a first parameter or a second parameter, the first parameter being used for setting of communication using a plurality of links, the second parameter being used for setting of communication using a single link.

(12)

The wireless communication terminal according to (11), in which the communication section performs the communication on the basis of the setting using the first parameter or the second parameter during a period included in the first parameter.

(13)

The wireless communication terminal according to (12), in which the communication section performs the communication using the plurality of links on the basis of the setting using the first parameter.

(14)

The wireless communication terminal according to (12), in which the communication section performs the communication using the single link on the basis of the setting using the second parameter.

(15)

The wireless communication terminal according to (14), further including a controller that uses, in a case where the second parameter includes a value related to occupation time of a channel, a portion of a field in which the value related to the occupation time of a header in data to be transmitted is written is used for another piece of communication information.

(16)

The wireless communication terminal according to (15), in which the other piece of communication information includes at least one of information indicating communication using HARQ (Hybrid Automatic Repeat Request), information for prohibiting performances of transmission at a same time during spatial reuse in the communication performed on the basis of the setting using the second parameter, redundant information for error checking by CRC, information related to a number of connections, or information related to coding.

(17)

The wireless communication terminal according to any one of (12) to (16), in which the communication section transmits information that requires setting of the period to a wireless communication device.

(18)

The wireless communication terminal according to (17), in which the information that requires the setting of the period includes at least one of the first parameter, the second parameter, or information related to the period.

(19)

A wireless communication method performed by a wireless communication terminal, the wireless communication method including performing, during a predetermined period, communication on a basis of setting using a first parameter or a second parameter, the first parameter being used for setting of communication using a plurality of links, the second parameter being used for setting of communication using a single link.

REFERENCE SIGNS LIST

11: wireless communication device
12: wireless communication terminal
31: controller
32: power source section
33-1 and 33-2: communication section
35: memory section
50: memory section
51: data processor
52: wireless controller
53: modulator/demodulator
54: signal processor
55: channel estimator
56-1 to 56-N: wireless I/F
57-1 to 57-N: amplifier
58-1 to 58-N: antenna

The invention claimed is:

1. A wireless communication device comprising:
a control circuit that transmits a first parameter and a second parameter, the first parameter being used for setting of communication in which a wireless communication terminal uses a plurality of links, the second parameter being used for setting of communication in which the wireless communication terminal uses a single link,
wherein the first parameter and the second parameter each include a parameter related to acquisition of a transmission opportunity,
wherein the first parameter and the second parameter each include, as the parameter related to the acquisition of the transmission opportunity, a parameter related to a frame transmission interval or a parameter related to transmission waiting time, and the frame transmission interval and the transmission waiting time are set to be smaller in the first parameter than in the second parameter, or
wherein the first parameter and the second parameter each include, as the parameter related to the acquisition of the transmission opportunity, a value related to occupation time of a channel, and the value related to the occupation time of the channel is set to be longer in the first parameter than in the second parameter.

2. The wireless communication device according to claim 1, wherein the first parameter further includes a parameter related to a period in which the wireless communication terminal performs communication on a basis of setting using the first parameter or the second parameter.

3. The wireless communication device according to claim 2, wherein the parameter related to the period indicates start time of the period and a length of the period.

4. The wireless communication device according to claim 2, wherein the parameter related to the period indicates an end of the period.

5. The wireless communication device according to claim 1, wherein the control circuit transmits the first parameter and the second parameter for each link information or for each access category information.

6. The wireless communication device according to claim 1, wherein the control circuit transmits, as the second parameter, an existing EDCA (Enhanced Distributed Channel Access) parameter.

7. A wireless communication method performed by a wireless communication device, the wireless communication method comprising:
communicating with another wireless communication device; and
transmitting a first parameter and a second parameter, the first parameter being used for setting of communication in which a wireless communication terminal uses a plurality of links, the second parameter being used for setting of communication in which the wireless communication terminal uses a single link, wherein the first parameter and the second parameter each include a parameter related to acquisition of a transmission opportunity, wherein the first parameter and the second parameter each include, as the parameter related to the acquisition of the transmission opportunity, a parameter related to a frame transmission interval or a parameter related to transmission waiting time, and the frame transmission interval and the transmission waiting time are set to be smaller in the first parameter than in the second parameter, or wherein the first parameter and the second parameter each include, as the parameter related to the acquisition of the transmission opportunity, a value related to occupation time of a channel, and the value related to the occupation time of the channel is set to be longer in the first parameter than in the second parameter.

8. A wireless communication terminal comprising:
a control circuit that performs communication on a basis of setting using a first parameter or a second parameter, the first parameter being used for setting of communication using a plurality of links, the second parameter being used for setting of communication using a single link, wherein the control circuit performs the communication on the basis of the setting using the first parameter or the second parameter during a period included in the first parameter, wherein, in a case where the control circuit performs the communication using the single link on the basis of the setting using the second parameter, and in a case where the second parameter includes a value related to occupation time of a channel, a portion of a field in which the value related to the occupation time of a header in data to be transmitted is written is used for another piece of communication information, wherein the other piece of communication information includes at least one of information indicating communication using HARQ (Hybrid Automatic Repeat Request), information for prohibiting performances of transmission at a same time during spatial reuse in the communication performed on the basis of the setting using the second parameter, redundant information for error checking by CRC, information related to a number of connections, or information related to coding.

9. The wireless communication terminal according to claim 8, wherein the control circuit performs the communication using the plurality of links on the basis of the setting using the first parameter.

10. The wireless communication terminal according to claim 8, wherein the control circuit transmits information that requires setting of the period to a wireless communication device.

11. The wireless communication terminal according to claim 10, wherein the information that requires the setting of the period includes at least one of the first parameter, the second parameter, or information related to the period.

12. A wireless communication method performed by a wireless communication terminal, the wireless communication method comprising:
communicating with another wireless communication device; and
performing the communication on a basis of setting using a first parameter or a second parameter, the first parameter being used for setting of communication using a plurality of links, the second parameter being used for setting of communication using a single link, wherein the communication is performed on the basis of the setting using the first parameter or the second parameter during a period included in the first parameter, wherein, in a case where the communication uses the single link on the basis of the setting using the second parameter, the communication uses, and in a case where the second parameter includes a value related to occupation time of a channel, a portion of a field in which the value related to the occupation time of a header in data to be transmitted is written is used for another piece of communication information, wherein the other piece of communication information includes at least one of information indicating communication using HARQ (Hybrid Automatic Repeat Request), information for prohibiting performances of transmission at a same time during spatial reuse in the communication performed on the basis of the setting using the second parameter, redundant information for error checking by CRC, information related to a number of connections, or information related to coding.

* * * * *